US011951628B2

(12) United States Patent
Song et al.

(10) Patent No.: US 11,951,628 B2
(45) Date of Patent: *Apr. 9, 2024

(54) ROBOT CONTROLLING METHOD, MOTION COMPUTING DEVICE AND ROBOT SYSTEM

(71) Applicant: National Yang Ming Chiao Tung University, Hsinchu (TW)

(72) Inventors: Kai-Tai Song, New Taipei (TW); Yi-Hung Lee, Taipei (TW)

(73) Assignee: National Yang Ming Chiao Tung University, Hsinchu (TW)

(*) Notice: Subject to any disclaimer, the term of this patent is extended or adjusted under 35 U.S.C. 154(b) by 393 days.

This patent is subject to a terminal disclaimer.

(21) Appl. No.: 17/306,951

(22) Filed: May 4, 2021

(65) Prior Publication Data
US 2022/0250244 A1 Aug. 11, 2022

(30) Foreign Application Priority Data
Feb. 3, 2021 (TW) .................................. 110104082

(51) Int. Cl.
*B25J 9/16* (2006.01)
*G05B 19/418* (2006.01)
(Continued)

(52) U.S. Cl.
CPC ........... *B25J 9/1666* (2013.01); *B25J 9/1633* (2013.01); *B25J 9/1653* (2013.01); *B25J 9/1697* (2013.01);
(Continued)

(58) Field of Classification Search
CPC ...... B25J 9/1666; B25J 9/1633; B25J 9/1653; B25J 9/1697; G05B 19/41815;
(Continued)

(56) References Cited

U.S. PATENT DOCUMENTS 5,006,988 A * 4/1991 Borenstein ........... G05D 1/0255
701/25
8,914,152 B2 12/2014 Scheurer et al.
(Continued)

FOREIGN PATENT DOCUMENTS

CN 110503040 A 11/2019
CN 111958590 A 11/2020
(Continued)

OTHER PUBLICATIONS

Hsien-I Lin et al., "Robotic Arm Path Planning Based on Three-Dimensional Artificial Potential Field", 2018 18th International Conference on Control, Automation and Systems (ICCAS 2018), Oct. 17-20, 2018, pp. 740-745.
(Continued)

*Primary Examiner* — Abby Y Lin
*Assistant Examiner* — Dylan Brandon Mooney
(74) *Attorney, Agent, or Firm* — CKC & Partners Co., LLC

(57) ABSTRACT

A robot controlling method includes following operations. A depth image is obtained by the depth camera. A processing circuit receives the depth image and obtains an obstacle parameter of an obstacle and a tool parameter of a tool according to the depth image. The tool is set on the end of a robot. The processing circuit obtains a distance vector between the end and the obstacle parameter. The processing circuit obtains a first endpoint vector and a second endpoint vector between the tool parameter and the obstacle parameter. The processing circuit establishes a virtual torque according to the distance vector, the first endpoint vector, and the second endpoint vector. The processing circuit outputs control signal to the robot according to the tool parameter, the obstacle parameter and the virtual torque to drive the robot to move or rotate the tool to a target.

18 Claims, 8 Drawing Sheets

(51) Int. Cl.
*G06T 7/579* (2017.01)
*G06T 7/73* (2017.01)

(52) U.S. Cl.
CPC ........ *G05B 19/41815* (2013.01); *G06T 7/579* (2017.01); *G06T 7/73* (2017.01); *G05B 2219/39091* (2013.01); *G05B 2219/40202* (2013.01); *G06T 2207/10028* (2013.01)

(58) Field of Classification Search
CPC ........... G05B 2219/39091; G05B 2219/40202; G06T 7/579; G06T 7/73; G06T 2207/10028; G06T 2207/30164; G06T 2200/04
See application file for complete search history.

(56) References Cited

U.S. PATENT DOCUMENTS

| | | | |
|---|---|---|---|
| 2014/0067121 A1 | 3/2014 | Brooks et al. | |
| 2016/0075026 A1* | 3/2016 | Sisbot | G05D 1/0217 700/255 |
| 2016/0107313 A1 | 4/2016 | Hoffmann et al. | |
| 2017/0348856 A1* | 12/2017 | Nakaya | B25J 9/1666 |
| 2019/0344445 A1* | 11/2019 | Song | B25J 9/1697 |

FOREIGN PATENT DOCUMENTS

| | | | |
|---|---|---|---|
| CN | 112060079 A | | 12/2020 |
| JP | 2011500349 A | | 1/2011 |
| JP | 2011031309 A | * | 2/2011 |
| JP | 2012011498 A | * | 1/2012 |
| JP | 2014124734 A | * | 7/2014 |

OTHER PUBLICATIONS

Tuomo Kivelä et al., "Real-time Distance Query and Collision Avoidance for Point Clouds with Heavy-duty Redundant Manipulator", 2017 IEEE 8th International Conference on CIS & RAM, Ningbo, China, pp. 272-277.

Shijun Wang et al., "Motion Planning for Vision-based Stevedoring Tasks on Industrial Robots", Proceedings of 2015 IEEE International Conference on Mechatronics and Automation (ICMA), Aug. 2-5, 2015, pp. 1264-1269.

Inyoung Ko et al., "Randomized path planning on vector fields", The International Journal of Robotics Research, vol. 33, No. 13, 2014, pp. 1664-1682.

Liu Qiang et al., "The KD-Tree-Based Nearest-Neighbor Search Algorithm in GRID Interpolation", 2012 International Conference on Image Analysis and Signal Processing, Nov. 9-11, 2012.

Jen-Hao Chen et al., "Collision-Free Motion Planning for Human-Robot Collaborative Safety under Cartesian Constraint", 2018 IEEE International Conference on Robotics and Automation (ICRA), May 21-25, 2018, pp. 4348-4354.

* cited by examiner

ROBOT CONTROLLING METHOD, MOTION COMPUTING DEVICE AND ROBOT SYSTEM

RELATED APPLICATIONS

This application claims priority to Taiwan Application Serial Number 110104082, filed Feb. 3, 2021, which is herein incorporated by reference in its entirety.

BACKGROUND

Field of Disclosure

The present disclosure relates to motion computing devices, robot systems and robot controlling methods, and in particular to collaborative robot motion computing devices, collaborative robot systems and collaborative robot controlling methods for use in human-robot collaboration.

Description of Related Art

With the development of Industry 4.0, the proportion of robots used in the industry is increasing year by year. In order to lower the programming threshold for users, the industry is further using collaborative robots, which are designed to work together with users to increase the quality of their work in a complementary way.

For collaborative robotics, an important issue is how to make a robot arm dodge immediately to avoid hurting the user or being affected by obstacles. However, robots often install different tools for different tasks when performing tasks. Therefore, one of the problems to be solved is how to provide suitable obstacle avoidance strategies for different tool installations.

SUMMARY

An aspect of the present disclosure is related to a robot controlling method.

According to one or more embodiments of the present disclosure, a robot controlling method includes following operations. A depth image of a robot and a workspace of the robot are captured by a depth camera. A tool is located on the end of the robot. The depth image is received and processed. An obstacle parameter of an obstacle and a tool parameter of the tool are obtained by a processing circuit according to the depth image. A distance vector between the end of the robot and the obstacle parameter is obtained by the processing circuit. A first endpoint vector and a second endpoint vector are established by the processing circuit according to the tool parameter and the obstacle parameter. A virtual torque is established by the processing circuit according to the distance vector, the first endpoint vector, and the second endpoint vector. A control signal is outputted by the processing circuit according to the tool parameter, the obstacle parameter and the virtual torque to the robot to drive the robot to move and rotate the tool to a target.

In one or more embodiments of the present disclosure, the robot controlling method further includes following operations. An object point cloud according to the depth image is established by the processing circuit. An obstacle point cloud according to the object point cloud is established by the processing circuit. A current tool point cloud of the tool according to the object point cloud is established by the processing circuit. The tool parameter and the obstacle parameter are respectively obtained according to the current tool point cloud and the obstacle point cloud by the processing circuit.

In some embodiments of the present disclosure, establishing the tool parameter and the obstacle parameter according to the current tool point cloud and the obstacle point cloud respectively by the processing circuit further includes following operations. A history tool point cloud information is established by the processing circuit according to the object point cloud. An observation tool point cloud is segmented from the object point cloud by the processing circuit. A prediction tool point cloud is established by the processing circuit according to the history tool point cloud information and a robot pose of the robot. The observation tool point cloud and the prediction tool point cloud are superimposed by the processing circuit to establish the current tool point cloud.

In some embodiments of the present disclosure, the robot controlling method further includes the following operations. A background point cloud is separated from the object point cloud according to a recorded background information by the processing circuit. Further, a robot point cloud is separated from the object point cloud by the processing circuit according to the robot pose information. Before establishing the current tool point cloud of the tool and the obstacle point cloud of the obstacle according to the object point cloud, the background point cloud and the robot point cloud are subtracted from the object point cloud by the processing circuit.

In some embodiments of the present disclosure, the tool parameter includes two opposite endpoints of the tool. The obstacle parameter includes an obstacle point. The distance vector between the end of the robot and the obstacle point of the obstacle is established by the processing circuit. The first endpoint vector and the second endpoint vector are established according to the two opposite endpoints of the tool and the obstacle point of the obstacle respectively by the processing circuit.

In some embodiments of the present disclosure, two initial points of the first endpoint vector and the second endpoint vector respectively correspond to the two opposite endpoints of the tool. A terminal point of the first endpoint vector is the same as a terminal point of the second endpoint vector. The same terminal point of the first and second endpoint vectors is the obstacle point of the obstacle parameter. Establishing the virtual torque by the processing circuit further includes following operations. A magnitude of the virtual torque is established according to the first endpoint vector and the second endpoint vector. A direction of the virtual torque is established by the processing circuit according to the distance vector and an endpoint velocity of the end of the robot.

In some embodiments of the present disclosure, the control signal is adjusted based on the virtual torque to rotate the robot and reduce the length of the first endpoint vector when the length of the first endpoint vector is greater than the length of the second endpoint vector.

In one or more embodiments of the present disclosure, the robot controlling method further includes following operations. An attractive force parameter is obtained by the processing circuit according to a first vector between the robot and a target. A repulsive force parameter is obtained by the processing circuit according to a second vector between the robot and the obstacle parameter. The processing circuit is used to output the control signal according to the attractive force parameter, the repulsive force parameter and the virtual torque to drive the robot to move and rotate the tool to the target when the processing circuit is used to output the control signal to the robot according to the tool parameter.

In some embodiments of the present disclosure, the robot controlling method further includes following operations. The attractive force parameter and the repulsive force parameter are added and converted into a speed command by the processing circuit. The virtual torque is converted into an angular velocity command, wherein the angular velocity command is used to control the robot to drive the tool to rotate by the processing circuit. A limitation parameter is converted into a limitation command by the processing circuit. The limitation parameter is associated with a third vector between a critical control point of the robot and the obstacle parameter. The limitation parameter is configured to limit a speed of the critical control point of the robot. The control signal is obtained according to the speed command, the angular velocity command and the limitation command.

In one or more embodiments of the present disclosure, the obstacle parameter includes an obstacle point. When a distance between one endpoint of the tool and the end of the robot is different from a distance between an opposite one endpoint of the tool and the end of the robot, the processing circuit is used to establish the end of the robot equidistant from two virtual endpoints according to the two endpoints of the tool, the two virtual endpoints are used for the tool parameter, the distance vector between the end of the robot and the obstacle point is established by the processing circuit, and the first endpoint vector and the second endpoint vector are established according to the two virtual endpoints and the obstacle point of the obstacle parameter by the processing circuit.

An aspect of the present disclosure is related to a motion computing device.

According to one or more embodiments of the present disclosure, a motion computing device includes a processing circuit, a memory, and one or more programs. The memory is electrically connected to the processing circuit. The one or more programs are stored in the memory to be launched by the processing circuit. The one or more programs include instructions for following operations. A depth image of a robot and a workspace of the robot captured by a depth camera is received. A tool is located on an end of the robot. An obstacle parameter of an obstacle and tool parameter of the tool according to the depth image is obtained. A distance vector between the end of the robot and the obstacle parameter is obtained. A first endpoint vector and a second endpoint vector are established according to the tool parameter and the obstacle parameter. A virtual torque is established according to the distance vector, the first endpoint vector, and the second endpoint vector. A control signal is outputted according to the tool parameter, the obstacle parameter and the virtual torque to the robot to drive the robot to move and rotate the tool to a target.

An aspect of the present disclosure is related to a robot system.

According to one or more embodiments of the present disclosure, a robot system includes a robot, a depth camera and a motion computing device. The robot includes an end. A tool is disposed on the end. The depth camera is configured to capture the robot and a workspace of the robot to obtain a depth image. The motion computing device is configured to receive the depth image and output a control signal according to the depth image to drive the robot. The motion computing device includes a processing circuit, a memory, and one or more programs. The memory is electrically connected to the processing circuit. The one or more programs are stored in the memory to be launched by the processing circuit. The one or more programs include instructions for following operation. Receive a depth image of the robot and the workspace of the robot captured by a depth camera. A tool is located on the end of the robot. Obtain an obstacle parameter of an obstacle and tool parameter of the tool according to the depth image. Obtain a distance vector between the end of the robot and the obstacle parameter. Establish a first endpoint vector and a second endpoint vector according to the tool parameter and the obstacle parameter. Establish a virtual torque according to the distance vector, the first endpoint vector, and the second endpoint vector. Output a control signal according to the tool parameter, the obstacle parameter and the virtual torque to the robot to drive the robot to move and rotate the tool to a target.

In one or more embodiments of the present disclosure, the one or more programs further include instructions for following operations. Establish an object point cloud according to the depth image. Establish an obstacle point cloud according to the object point cloud. Establish a current tool point cloud of the tool according to the object point cloud. Obtain the tool parameter and the obstacle parameter according to the current tool point cloud and the obstacle point cloud respectively.

In some embodiments of the present disclosure, the establishing the current tool point cloud of the tool according to the object point cloud further includes following operations. Establish a history tool point cloud information according to the object point cloud. Separate an observation tool point cloud from the object point cloud. Establish a prediction tool point cloud according to the history tool point cloud information and a robot pose of the robot. Superimpose the observation tool point cloud and the prediction tool point cloud to establish the current tool point cloud.

In some embodiments of the present disclosure, the one or more programs further includes following operations. Separate the background point cloud from the object point cloud according to a recorded background information. Separate the robot point cloud from the object point cloud according to a robot pose information. Before establishing the current tool point cloud of the tool and the obstacle point cloud of the obstacle according to the object point cloud, the background point cloud and the robot point cloud are subtracted from the object point cloud by the processing circuit.

In some embodiments of the present disclosure, the tool parameter includes two opposite endpoints of the tool. The obstacle parameter includes an obstacle point. The distance vector between the end of the robot and the obstacle point of the obstacle is established by the processing circuit. The first endpoint vector and the second endpoint vector are established according the two opposite endpoints of the tool and the obstacle point of the obstacle respectively by the processing circuit.

In some embodiments of the present disclosure, two initial points of the first endpoint vector and the second endpoint vector respectively correspond to the two opposite endpoints of the tool. A terminal point of the first endpoint vector is the same as a terminal point of the second endpoint vector. The same terminal point of the first and second endpoint vectors is the obstacle point of the obstacle parameter. Establishing the virtual torque further includes following operations. Establish a magnitude of the virtual torque according to the first endpoint vector and the second endpoint vector. Establish a direction of the virtual torque according to the distance vector and an endpoint velocity of the end of the robot.

In some embodiments of the present disclosure, the control signal is adjusted based on the virtual torque to rotate the robot and reduce the length of the first endpoint vector when the length of the first endpoint vector is greater than the length of the second endpoint vector.

In one or more embodiments of the present disclosure, the one or more programs further include instructions for following operations. Obtain an attractive force parameter according to a first vector between the robot and a target. Obtain a repulsive force parameter according to a second vector between the robot and the obstacle parameter. The processing circuit is used to output the control signal according to the attractive force parameter, the repulsive force parameter and the virtual torque to drive the robot to move and rotate the tool to the target when the processing circuit is used to output the control signal to the robot according to the tool parameter.

In some embodiments of the present disclosure, the one or more programs further include instructions for following operations. Add and convert the attractive force parameter and the repulsive force parameter into a speed command. The speed command is used to control the robot to drive the tool to move. Convert the virtual torque into an angular velocity command, wherein the angular velocity command is used to control the robot to drive the tool to rotate. Convert a limitation parameter into a limitation command. The limitation parameter is associated with a third vector between a critical control point of the robot and the obstacle parameter. The limitation parameter is configured to limit a speed of the critical control point of the robot. Obtain the control signal according to the speed command, the angular velocity command and the limitation command.

In summary, the present disclosure provides a robot controlling method, a corresponding motion computing device and a robot system that can consider obstacle avoidance planning when setting up tools on a robot, and it facilitates human-robot collaboration.

It is to be understood that both the foregoing general description and the following detailed description are by examples, and are intended to provide further explanation of the invention as claimed.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the present disclosure.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

The present disclosure provides a robot controlling method, a corresponding motion computing system, and a robot system, thereby generalizing planning of the obstacle avoidance path of the robot and taking into account the additional tools installed on the robot in real time.

Figure 1:
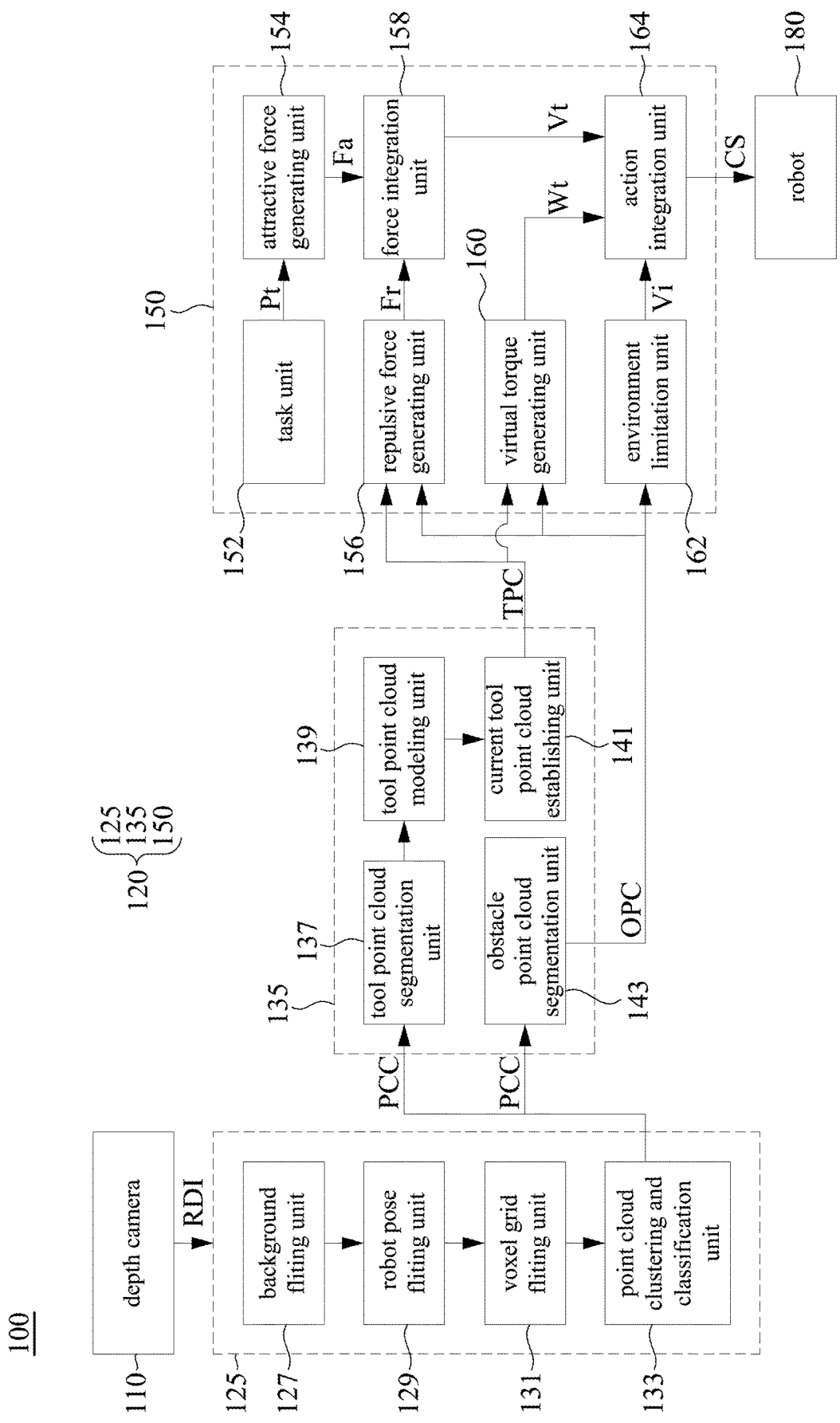
FIG. 1 illustrate a block diagram of a robot system according to one embodiment of the present disclosure.

Reference is made by FIG. 1. FIG. 1 illustrates a block diagram of a robot system 100 according to one embodiment of the present disclosure.

As shown in FIG. 1, in this embodiment, the robot system 100 includes a depth camera 110, a motion computing device 120 used for computing and a robot. The motion computing device 120 is electrically connected to the depth camera 110 and the robot 180. In some specific embodiments, KinectV2 RGB-D can be used as the depth camera 110. In some specific embodiments, Techman Robot with TM-collaboration type robot arms can be used as the robot 180. It should be noted that the above examples are merely illustrations and not intended to limit the disclosure.

In some embodiments, the depth camera 110 is used to capture depth images in the workspace of the robot 180, thereby outputting raw depth image RDI to the motion computing device 120. After receiving the raw depth images RDI, the motion computing device 120 performs computing processing to provide a control signal CS to the robot 180. Therefore, the robot 180 is driven according to the control signal CS after receiving the control signal CS.

As shown in FIG. 1, in this embodiment, the motion computing device 120 includes an environment monitoring module 125, a point cloud segmentation module 135 and an obstacle avoidance path planning module 150. The environment monitoring module 125 is electrically connected to the depth camera 110 to obtain the raw depth images. The raw depth images RDI are processed by the environment monitoring module 125 so that the environment monitoring module 125 can output point cloud clusters PCC obtained from the raw depth images RDI. After the point cloud clusters PCC are received by the point cloud segmentation module 135, current tool point clouds TPC and obstacle point clouds OPC can be separated from the point cloud clusters PCC. Then, the obstacle avoidance path planning module 150 receives the current tool point clouds TPC and the obstacle point clouds OPC, thereby planning an obstacle avoidance path that the robot 180 can move and providing a control signal CS corresponding to the obstacle avoidance path. The control signal CS is outputted to the robot 180 by the obstacle avoidance path planning module 150 to drive the robot 180 performing motions.

For detail performing of the environment monitoring module 125, the point cloud segmentation module 135 and the obstacle avoidance path planning module 150 of the motion computing device 120, please refer to following discussion. In some embodiments, the environment monitoring module 125, the point cloud segmentation module 135 and the obstacle avoidance path planning module 150 of the motion computing device 120 above therein may be implemented by various hardware or software, such as a circuit (whether a dedicated circuit or general circuit operated under the control of one or more processors and encoding instructions). In general, the processing circuit includes transistors or other circuit components for controlling the operations and the functions of the corresponding electrical circuit described in this disclosure.

For example, in some embodiments, the motion computing device 120 includes a processing circuit, a memory and one or more programs. The memory is electrically connected to the processing circuit. The one or more programs are stored in the memory and configured to be executed by the processing circuit. In operation, the processing circuit is able to execute the one or more programs and/or instructions stored in the memory to deal with the various data of the motion computing device and execute the various function units of the motion computing device.

For example, the processing circuit may be realized by central processor, microprocessor, digital signal processor (DSP), complex programmable logic device (CPLD), field-programmable gate array (FPGA). In addition, the memory includes one or more memory devices, and each memory device or multiple memory devices include a computer readable recording medium storing program. The memory may be realized by a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

It should be noted that the ways to realize the motion computing device are not limited by the embodiments above. Furthermore, the connections between these devices and elements are not limited by the embodiments above. The devices, the elements and the connections between them enable the motion computing device to implement any of the configurations described following, and/or may be applied here in the claims.

Figure 2:
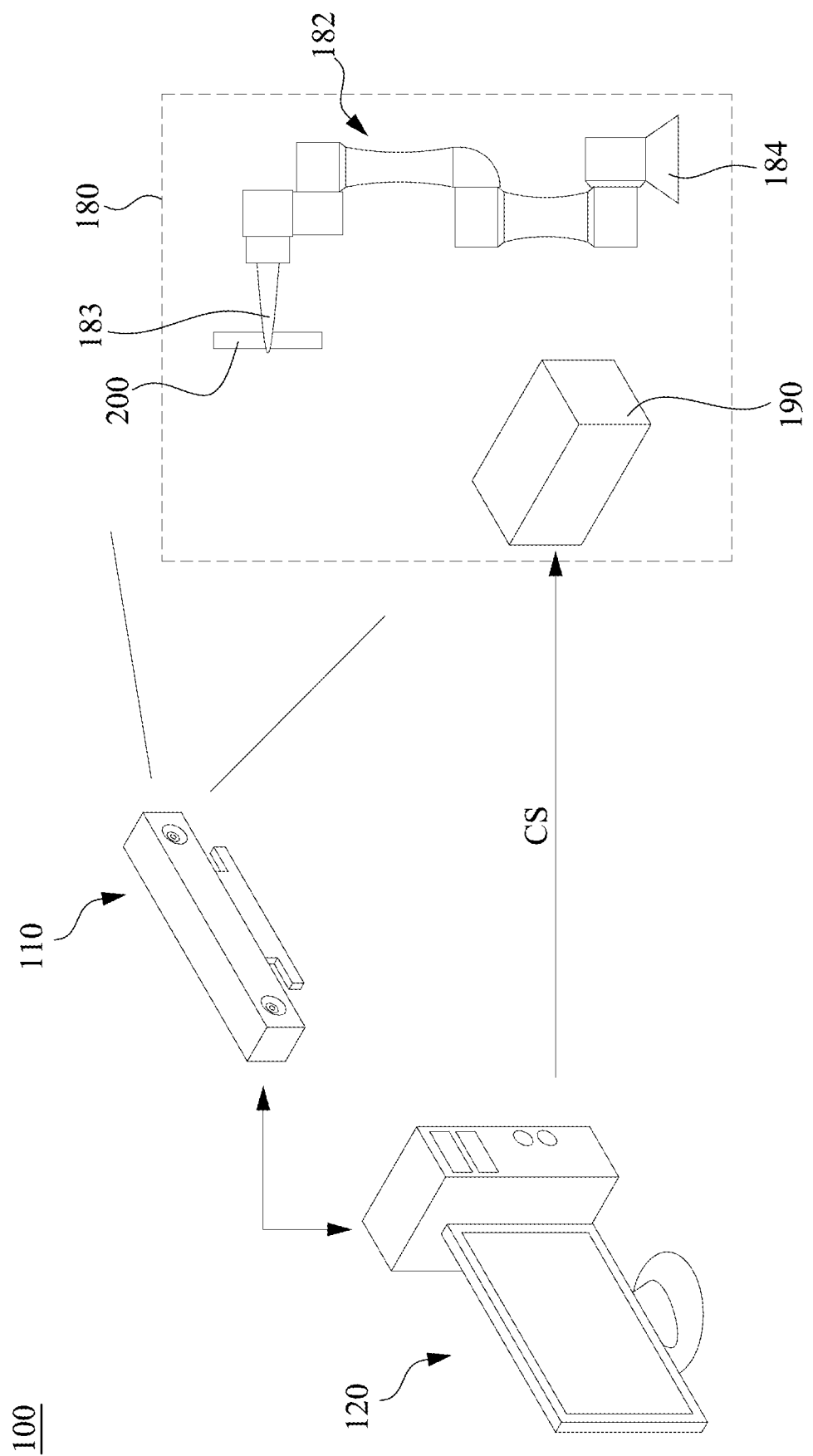
FIG. 2 illustrate a schematic view of a robot system according to one embodiment of the present disclosure.

FIG. 2 illustrates a schematic view of a robot system 100 according to one embodiment of the present disclosure.

In the embodiment illustrated in FIG. 2, the motion computing device 120 is a personal computer including a processor and memories, and the processor performs one or more programs stored in the memories to control the robot 180. The embodiment illustrated in FIG. 2 is an example and but not limited to the present disclosure.

In the embodiment illustrated in FIG. 2, the robot 180 includes a robot body 182 and a robot controlling device 190. The robot controlling can receive the control signal CS from the motion computing device 120 to drive the robot body 182.

Figure 3:
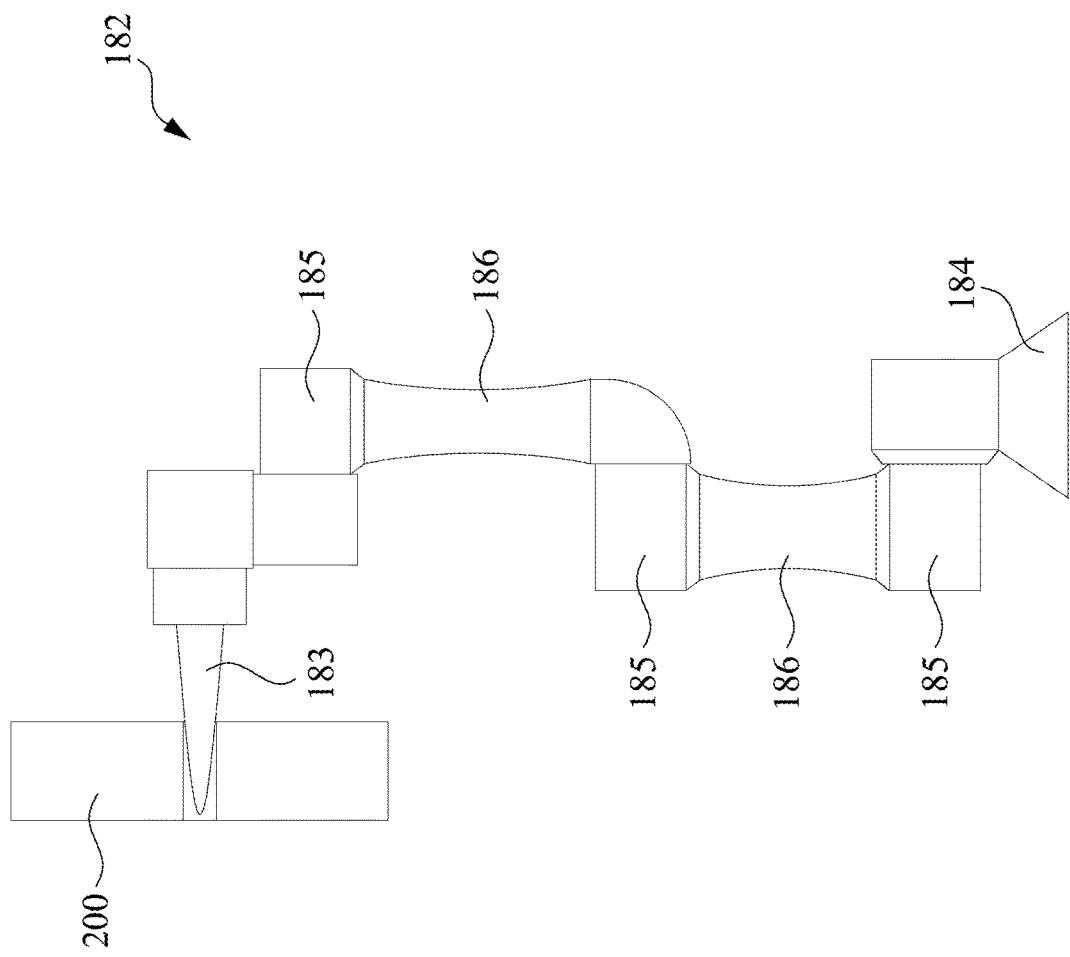
FIG. 3 illustrates a perspective view of a robot body according to one embodiment of the present disclosure.

In this embodiment, a tool 200 is located on the robot body 182. In detail, the tool is located on an end effector 183 of the robot body. Reference is made by FIG. 3. FIG. 3 illustrates a perspective view of a robot body 180 according to one embodiment of the present disclosure.

As shown in FIG. 3, in this embodiment, the robot 180 includes an end effector 183, a holder 184, critical control points 185 and links 186. The holder 184 is used to fix the overall robot body 182. The critical control points 185 of the robot body 182 are, for example, rotatable joints, so that the links 186 are connected to each other through the critical control points 185, and the robot body 182 connected to the links 186. The end effector 183 is located on an end of the robot body 182. The tool 200 used by the robot body 182 to perform tasks is located on the end effector 183.

In FIG. 3, a shape of the tool is schematically illustrated as a rectangle and but not limited to shape of the tool 200 of the present disclosure.

Please return to FIG. 2. In the robot system 100 of one embodiment of the present disclosure, the raw depth image RDI of the robot 180 and its working space is obtained in real time through the depth camera 110. The motion computing device 120 is electrically coupled to the depth camera 110. Therefore, the motion computing device 120 is able to receive the raw depth image RDI and provide the control signal CS to drive the robot 180 through a robot controlling method (for example, the robot controlling method 300 in following FIG. 4).

Figure 4:
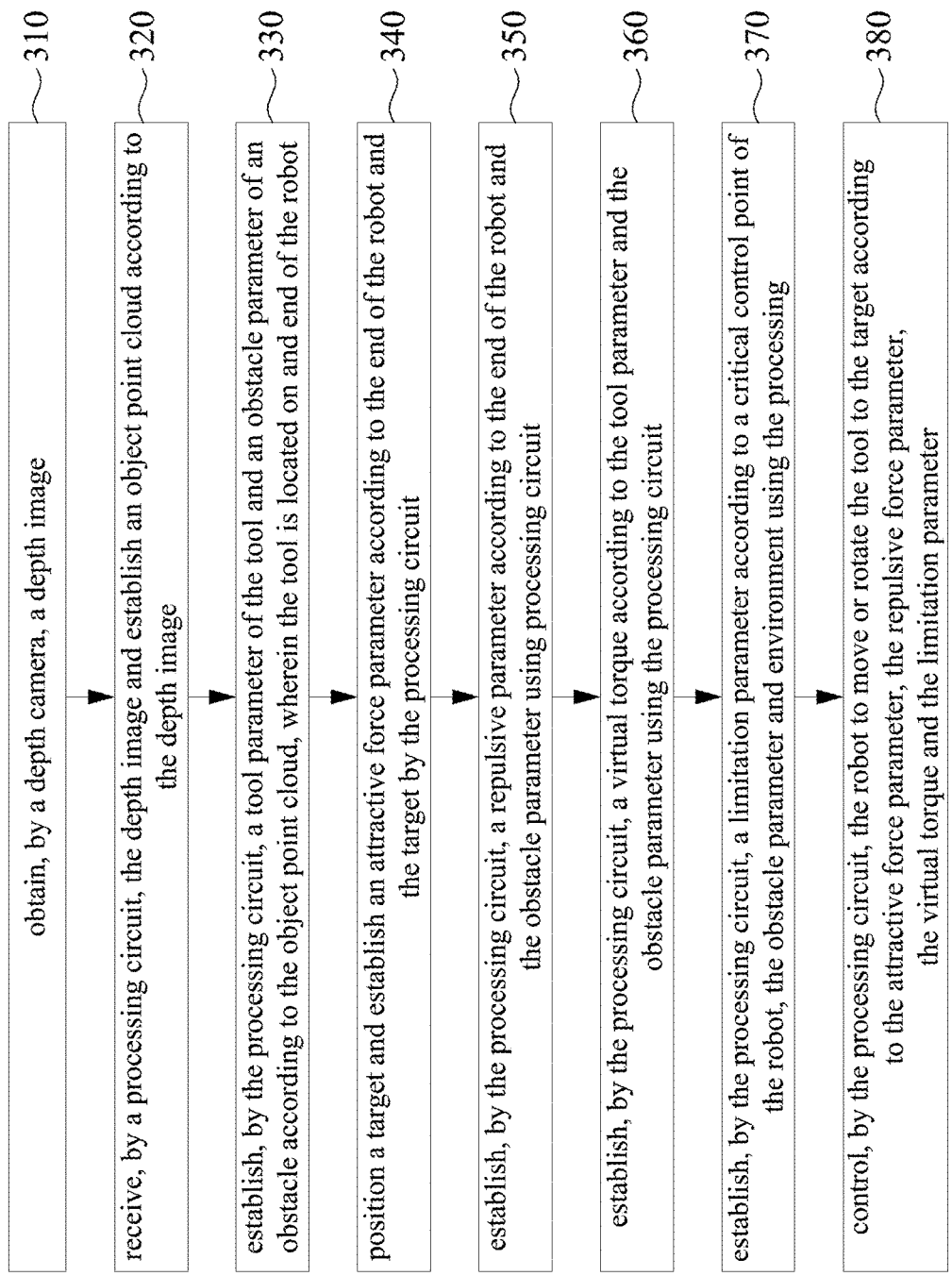
FIG. 4 illustrates a flow chart of a robot controlling method according to one embodiment of the present disclosure.

Reference is made by FIG. 1 and FIG. 4. FIG. 4 illustrates a flow chart of a robot controlling method 300 according to one embodiment of the present disclosure. An example of the architecture of a motion computing device 120 of the robot system 100 is shown in FIG. 1.

In operation 310, raw depth images of the robot 180 and workspace of the robot 180 are captured by the depth camera 110.

The tool 200 is located on the end effector 183 of the robot body 182 of the robot 180. The raw depth images RDI are obtained by capturing the robot 182 and the tool 200 using the depth camera 110.

In some embodiments, the depth camera 110 fixedly captures the workspace of the robot 180. The workspace of the robot 180 corresponds to the range within which the end of the robot body 182 can move. The raw depth images RDI obtained by the depth camera 110 can be received by the environment monitoring module 125 of the motion computing device 120. The raw depth images RDI includes the robot body 182, the tool 200 located on the end effector 183 of the robot body 182, the background near the workspace of the robot 180 and obstacles that may appear in the workspace.

In operation 320, the raw depth images RDI are received by a processing circuit of the motion computing device 120, and the processing circuit 120 establishes object point clouds according the raw depth images RDI.

In this embodiment, the operation 320 can be realized to establish the environment monitoring module 125 of the motion computing device 120. As shown in FIG. 1, in this embodiment, the motion computing device 120 includes a background filtering unit 127, a robot pose filtering unit 129, a voxel grid point filtering unit 131, and a point cloud clustering and classification unit 133, which are sequentially connected to each other. Through the environmental monitoring module 125, the received raw depth images RDI can be converted into an object point cloud cluster PCC, and the object point cloud cluster PCC can be outputted.

As mentioned above, the environmental monitoring module 125 can be formed by the processing circuit inside the motion computing device 120 and the program stored in the memories. In this embodiment, the point cloud separating module 135 and the obstacle avoidance path planning module 150 of the motion computing device 120 can also be implemented by the processing circuit inside the motion computing device 120 and the programs stored in the memories.

After the environmental monitoring module 125 receives the raw depth images RDI, the raw depth images RDI are stored in a point cloud format. The point cloud can be regarded as a collection of multiple data points in a three-dimensional space. After the raw depth image RDI is stored in the point cloud format, it is presented as a plurality of discretely distributed points in the space, and different points in the space can include the color and reflection intensity information to different positions in the space. Different objects in the space correspond to different point clouds formed by different data points gathered in the original depth image RDI. For the operation of separating different point clouds corresponding to different objects, please refer to following discussion for details.

The background filtering unit 127 is used to filter the background information of the raw depth images RDI to form foreground depth images and output the foreground depth images to the robot pose filtering unit 129. Since the robot controlling method 300 merely plans the obstacle avoidance path in the workspace of the robot 180, the background information far away from the workspace in the raw depth image RDI can be removed, thereby reducing the resources required for computing.

In some embodiments, the depth camera 110 captures a fixed space range according to the workspace of the robot body 182. Therefore, the background filtering unit 127 can read in multiple raw depth images RDI in a fixed spatial range in advance to shield the background-related point cloud in the raw depth images RDI by comparison, thereby removing the background information of the raw depth images RDI to forming the foreground depth images.

The robot pose filtering unit 129 is used to filter the point cloud of the robot body in the foreground depth images. Since the robot body 182 is controllable, the information of the pose of the robot body 182 can be provided. Therefore, the point clouds associated with the robot body 182 can be obtained and excluded from the foregrounded depth images, further reducing the resources required for calculation.

For example, in some embodiments, the information of the robot body 182 is stored in the URDF format. The robot pose filtering unit 129 can further remove the point cloud of the robot body 182 in the foreground depth images through the Robot URDF Model Filter algorithm to form an extracted point cloud. The extracted point cloud excludes the background information far away from the workspace of the robot 180 and the information of the robot body 182 and only includes the point cloud of the tool 200 and obstacles that may be located in the workspace of the robot 180.

Also in order to reduce the resources required for computing, the voxel grid point filtering unit 131 is used to reduce the density of points in the extracted point clouds. In some embodiments, the voxel grid point filtering unit 131 may be implemented by a Voxel Grid filter algorithm. The voxel filtering algorithm divides the space into several regions, and a plurality of points contained in each region are sampled as an equivalent point by means of centroid interpolation. The extracted point cloud is processed by the voxel grid point filtering unit 131 to form a down-sampled point cloud, which is convenient for subsequent computing and processing.

The point cloud clustering and classification unit 133 is used to cluster the sampled point clouds. Specifically, in this embodiment, the point cloud clustering and classification unit 133 can cluster different equivalent points of the sampled point cloud to form a data structure according to different positions in the space.

In some embodiments, for different equivalent points in the sampled point clouds, the point cloud cluster and classification unit 133 can build a k-dimension tree (KD tree) data structure, each node of the KD tree corresponds to a small area in which one of the equivalent points in the space is located within. In other words, one of the equivalent points in the sampled point clouds correspond to one of the nodes of the KD tree. After the different equivalent points are clustered in different nodes of the KD tree through a k-dimensional tree algorithm, a nearest neighbor search (e.g., k-nearest neighbor search, k-NNS) can be realized according to the KD tree. For example, for a first equivalent point in the sampled point cloud, a second equivalent point closest to the first equivalent point in a specific range can be found through the nearest neighbor search algorithm of the KD tree with excellent efficiency.

Therefore, the point cloud clustering and classification unit 133 is able to cluster each equivalent point in the sampled point cloud to form the KD tree data structure, and then classify the equivalent points that are relatively concentrated in space. For example, the nearest neighbors between the equivalent points can be obtained through the nearest neighbor search, so as to analyze the aggregation of the equivalent points. After the sampled point clouds are processed by the point cloud clustering and classification unit 133, the object point cloud clusters PCC can be obtained according to the sampled point cloud.

In this embodiment, the raw depth images RDI are received and processed by the environment monitoring module 125, so that the object point cloud clusters PCC are outputted by the environment monitoring module 125. The object point cloud clusters PCC excludes environmental information and the influence of the robot body 182 and only includes the tool 200 and related point cloud information of possible obstacles in the workspace of the robot 180. In addition, the object point cloud clusters PCC have the clustered KD tree data structure, which is beneficial to the subsequent nearest neighbor search algorithm.

Return to FIG. 4. In operation 330, a tool parameter of the tool 200 and obstacle parameters of obstacles in the workspace of the robot 180 are established by the processing circuit of the motion computing device 120 according to the object point cloud. In this embodiment, the object point clouds have been clustered into the object point cloud clusters PCC. The tool 200 is located on the end effector 183 on the robot body 182 of the robot 180. Please also refer to FIG. 1. In this embodiment, operation 330 can be realized by the point cloud separating module 135 of the motion computing device 120.

In this embodiment, the tool parameter can be regarded as a tool point clouds corresponding to the tool 200. In this embodiment, the obstacle parameters can be regarded as obstacle point clouds corresponding to the obstacles in the workspace.

As shown in FIG. 1, in this embodiment, the point cloud separating module 135 includes a tool point cloud separating unit 137, a tool point cloud modeling unit 139, and a current tool point cloud establishing unit 141 that are connected in sequence. The point cloud separating module 135 further includes an obstacle point cloud segmentation unit 143. The tool point cloud segmentation unit 137 and the obstacle point cloud segmentation unit 143 can respectively receive the object point cloud cluster PCC outputted by the environment monitoring module 125 and the object point cloud clusters PCC is with the corresponding established k-dimensional tree cluster.

The tool point cloud segmentation unit 137 is used to segment an observation tool point cloud corresponding to the tool 200 from the object point cloud clusters PCC. The obstacle point cloud segmentation unit 143 can segment the obstacle point clouds corresponding to the obstacles from the object point cloud clusters PCC when the obstacles are located in the workspace of the robot 180.

Specifically, in some embodiments, since the position of the pose of the robot body 182 of the robot 180 in space is known, it can be determined what point cloud in the object point cloud cluster is closest to or contacted with the end effector 183 of the robot body 182 through the nearest neighbor algorithm.

Therefore, the tool point cloud segmentation unit 137 can segment the observation tool point cloud of the tool provided in the end effector 183 of the robot body 182. The observation tool point cloud is the tool point cloud currently observed by the depth camera 110. Once the observation tool point cloud is segmented and there are obstacles in the workspace of the robot 180, the obstacle point cloud segmentation unit 143 can correspondingly exclude the observation tool point cloud, and segment the obstacle point clouds from the object point cloud cluster PCC.

However, in some specific cases, the tool 200 can be blocked by the obstacle when the depth camera 110 captures the tool 200 and the robot 180. Further, since the tool 200 is additionally set on the end of the robot 182, a pose of the tool 200 cannot be completely confirmed like the robot body 182. Therefore, the observation tool point cloud may not fully reflect the position of the tool 200 in space. In this regard, in the point cloud segmentation module 135 of one embodiment of the present disclosure, a tool point cloud model establishing unit 139 and a current tool point cloud establishing unit 141 are further provided to handle the situation that the tool 200 is blocked by the obstacles.

Figure 5:
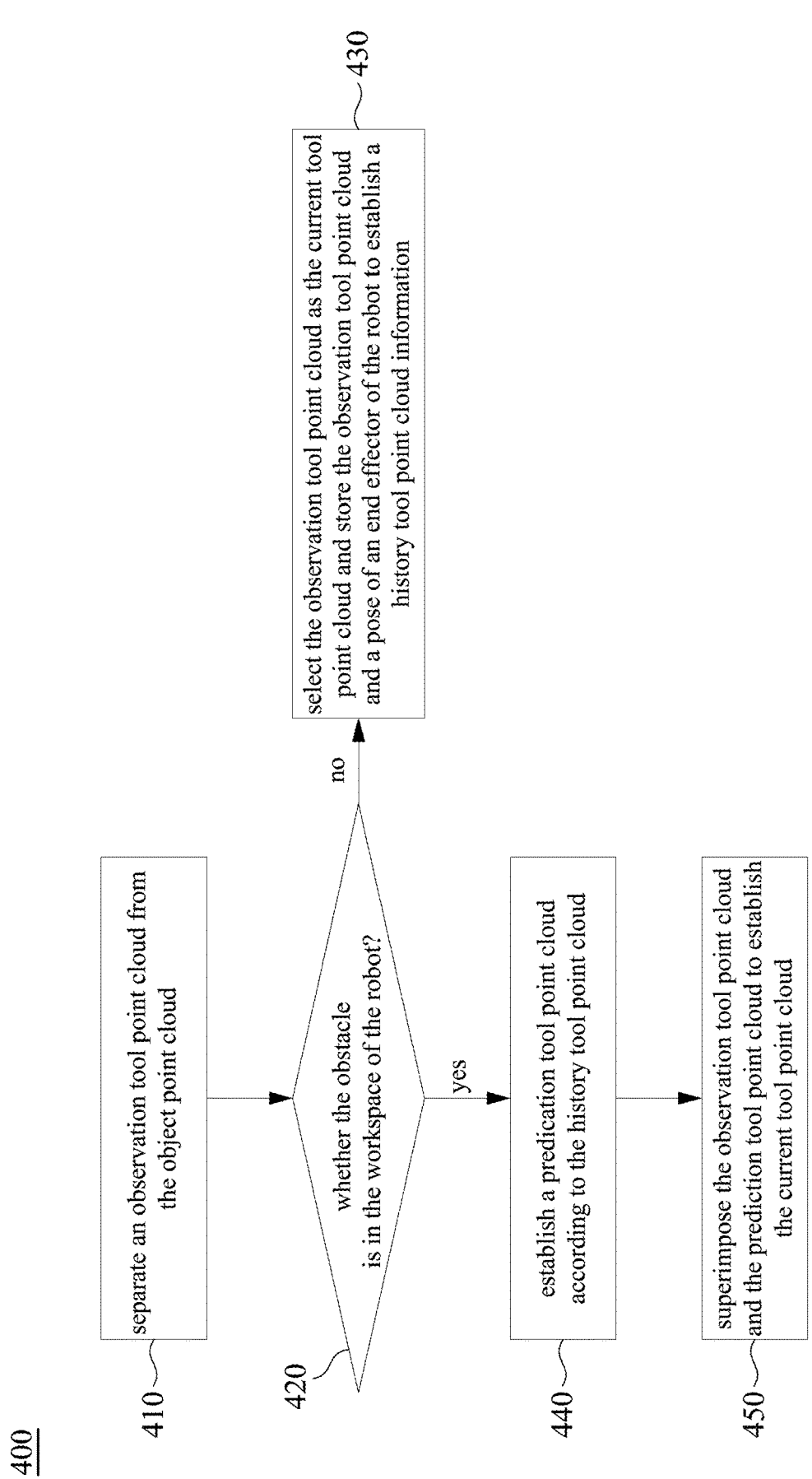
FIG. 5 illustrates a flow chart of a current point cloud establishing method according to one embodiment of the present disclosure.

To further explain the operation of the tool point cloud modeling unit 139 and the current tool point cloud establishing unit 141, please refer to FIG. 5.

FIG. 5 illustrates a flow chart of a current point cloud establishing method 400 according to one embodiment of the present disclosure. The current point cloud establishing method 400 includes operation 410 to operation 450. The current tool point cloud establishing method 400 is designed to be executed repeatedly within a period of time, so that history tool point cloud information can be accumulated to predict the predicted tool point cloud of the blocked tool.

In operation 410, an observation tool point cloud can be segmented from the object point cloud of the tool 200.

Proceed to operation 420, determine whether the obstacle is in the work space of the robot 180. If not, full pose of the tool 200 in the raw depth images RDI is not blocked, so as to proceed to operation 430.

In operation 430, the current tool point cloud establishing unit 141 is used to select the observation tool point cloud as the current tool point cloud TPC and store the observation tool point cloud and a pose of an end effector 183 of the robot body 182 to establish a history tool point cloud information. After the process 430, the current tool point cloud establishing unit 141 can directly output the current tool point cloud TPC, and the tool point cloud model creation unit 139 can record one or more history point cloud information before the obstacle enters the workspace of the robot 180. These recorded history point cloud information can completely reflect the pose of the tool 200 in space.

In operation 420, proceed to operation 440 once one of the obstacles enters the workspace. The tool point cloud modeling unit 137 establishes a predication tool point cloud according to the history tool point cloud. Since the history point cloud information includes the pose of the end effector 183 and the robot body 182 is controllable as a whole, the pose of the robot is known at any time, so that the tool point cloud modeling unit 139 can establish the predication tool point cloud based on the known pose of the end effector 183.

Then, proceed to operation 450. The current tool point cloud establishing unit 141 superimposes the observation tool point cloud and the prediction tool point cloud to establish the current tool point cloud TPC. The current tool point cloud TPC formed by the merge of the overlapping observation tool point cloud and the prediction tool point cloud can uniform the distribution density of equivalent points in the current tool point cloud TPC through the voxel filtering algorithm. Accordingly, the current tool point cloud TPC can includes the observation tool point cloud directly observed by the depth camera 110 and the blocking portion of the tool 200, thereby considering the blocking pose of the tool 200 in the current tool point cloud TPC through the prediction.

Therefore, operation 330 is implemented through the current point cloud establishing method 400 by the point cloud segmentation module 135. After receiving the object point cloud cluster PCC, the point cloud segmentation module 135 outputs the current tool point cloud TPC and the obstacle point clouds OPC.

In some embodiments, for the equivalent points of the current tool point cloud TPC and obstacle point clouds OPC in space, a Kalman filter can be used to provide prediction and update positions of the equivalent points in real time.

Return to FIG. 4. Continued with operation 330, proceed to operation 340 to operation 380. In this embodiment, operation 340 to operation 380 can be implemented by the obstacle avoidance path planning module 150 of the robot system 100.

In this embodiment, the obstacle avoidance path planning module 150 includes a task unit 152, an attractive force generating unit 154, a repulsive force generating unit 156, a force integration unit 158, a virtual torque generating unit 160, an environment limitation unit 162 and an action integration unit 164.

As shown in FIG. 1, the current tool point cloud TPC outputted by the 135 is received by the repulsive force generating unit 156 and the virtual torque generating unit 160. The obstacle point clouds OPC are received by the repulsive force generating unit 156, the virtual torque generating unit 160 and the environment limitation unit 162.

In operation 340, position a target and establish an attractive force parameter according to the end of the robot body 182 and the target by the processing circuit. In the operation 340 of this embodiment, the target is positioned by the task unit 152 of the obstacle avoidance path planning module 150. A target coordinate Pt of the positioned target is, for example, a point in the space, which is corresponding to a destination to which the tool 200 should be moved.

The target coordinate Pt outputted by the task unit 152 is received by the attractive force generating unit 154. In operation 340, the attractive force generating unit 154 establishes an attractive force parameter Fa according to a position of the 183 of the 182 and the target position Pt of the target, Therefore, in the subsequent planning of the path, the attractive force parameter Fa corresponds to a virtual attractive force, so that the virtual attractive force from the target coordinate Pt can be considered by the robot body 182 and the tool 200 is equivalently attracted by the target coordinate Pt in the planning of the path when the tool is moved by the robot body 182.

For example, in some embodiments, the attractive force parameter Fa is corresponding to an virtual attractive force between the end effecter 183 in which the tool 200 is located and the target coordinate Pt of the target. A direction of the virtual attractive force between the end effecter 183 and the target coordinate Pt is fixedly from an endpoint EP (as shown in following FIG. 6) of the end effecter 183 to the target coordinate Pt. The magnitude fa of the attractive force parameter Fa can be calculated based on following formula:

$$fa = Va(1 - e^{-\|\overrightarrow{De}\| \times \alpha_a})$$

In the above formula used for calculating the magnitude fa of the attractive force parameter Fa, the term "De" is corresponding to a distance vector De between the endpoint EP (as shown in following FIG. 6) of the end effecter 183 and the target coordinate Pt, the term "Va" is corresponding to a parameter Va, which is a maximum value of the magnitude fa of the attractive force Fa, the term "$\alpha_a$" is corresponding to a shaping factor $\alpha_a$, which has an unit of the reciprocal of distance and is used to determine an influence of the attractive force parameter Fa changing with the distance vector De.

According to the formula of the magnitude fa of the attractive force parameter Fa above, in this embodiment, once the distance vector De between the endpoint EP and the target coordinate Pt is farther, the attractive force parameter Fa will tend to the parameter Va, making the attractive force parameter Fa as a fixed attractive force. If the distance vector De is close to 0, the attractive force parameter Fa will also tend to 0, so as to avoid being over-attracted and unable to stop when the endpoint EP is close to the target coordinate Pt.

The calculation of the above attractive force parameter Fa can be performed by the attractive force generating unit 154 and outputted to the force integration unit 158.

Operation 350 can be realized by the repulsive force unit 156. In operation 350, a repulsive force parameter Fr is established by the repulsive force generating unit 156 according to the end effecter 183 of the robot body 182 and the obstacle parameter. As shown in FIG. 1, the current tool point cloud TPC and the obstacle point clouds OPC are received by the repulsive force generating unit 156.

In this embodiment, the obstacle parameter is the obstacle point cloud, and the repulsive force parameter Fr can be established by the repulsive force generating unit 156 according to the endpoint EP if the end effecter 183 and an obstacle point OP in the obstacle point clouds OPC. The repulsive force parameter Fr can be used to establish a virtual repulsive force, which can be considered to prevent the robot body 182 from contacting the tool 200 and the obstacles when planning the obstacle avoidance path later.

Figure 6:
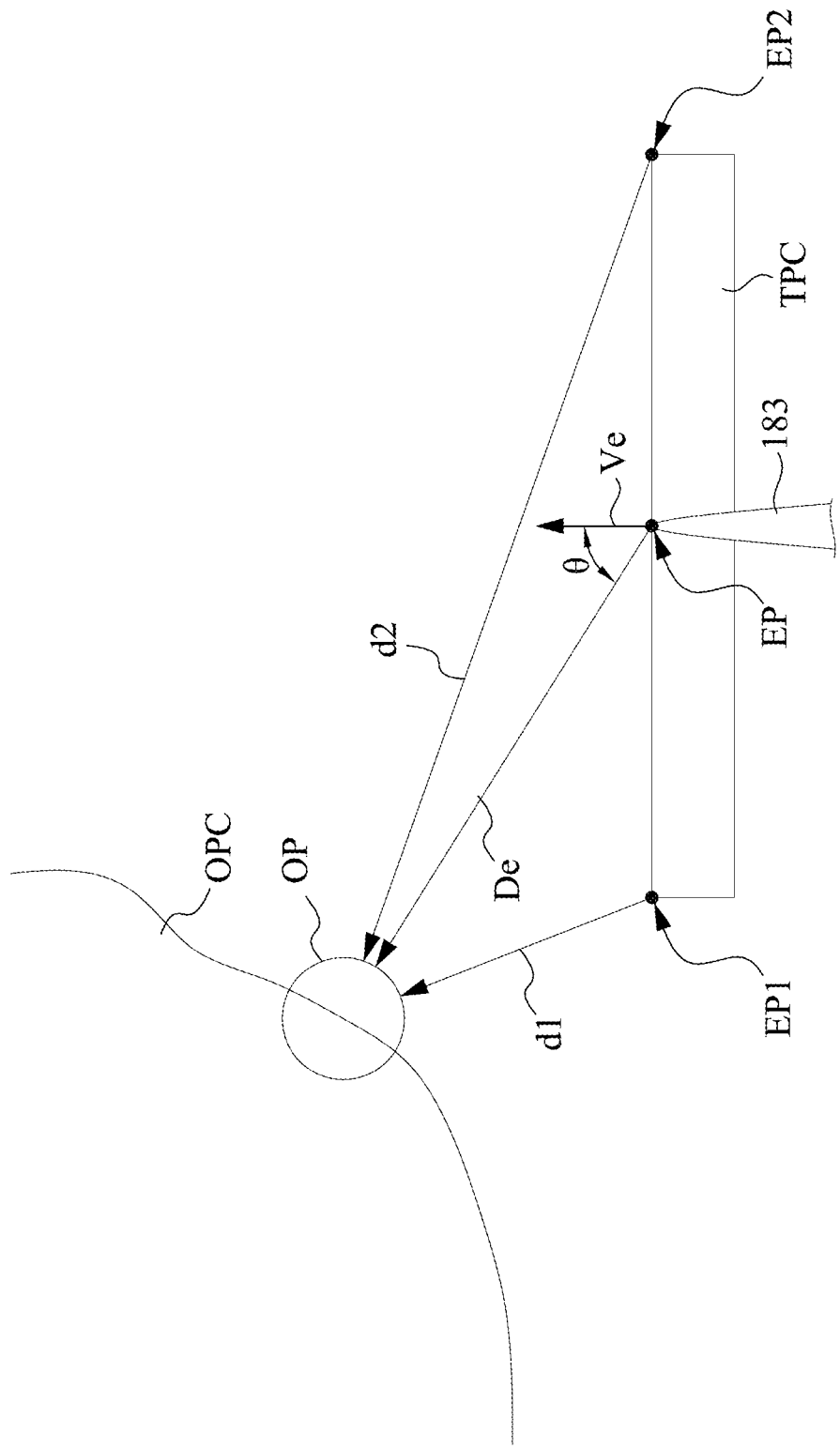
FIG. 6 illustrates a schematic view of a plurality of vectors required in a robot controlling method according to one embodiment of the present disclosure.

Specifically, reference is made by FIG. 6. FIG. 6 illustrates a schematic view of a plurality of vectors required in a robot controlling method 300 according to one embodiment of the present disclosure.

Once an obstacle enters the workspace of the robot 180, as shown schematically in FIG. 6, the obstacle has a corresponding obstacle point cloud OPC, and the tool 200 has a corresponding current tool point cloud TPC. In this embodiment, through the nearest neighbor algorithm based on the point cloud clusters PCC with KD tree data structure, the obstacle point OP closest to the current tool point cloud TPC in the obstacle point cloud OPC can be obtained, and a first endpoint EP1 adjacent to the obstacle point cloud OPC pair in the current tool point cloud TPC. FIG. 6 schematically shows the range of the obstacle point cloud OPC. In the embodiment shown in FIG. 6, the shortest distance between the current tool point cloud TPC and the obstacle point cloud OPC is a magnitude of a first endpoint vector d1 between the obstacle point OP and the first endpoint EP1. By avoiding the obstacle point OP from contacting the first endpoint EP1, the tool 200 can be kept from contacting the obstacle.

For example, in operation 350 of some embodiments, the repulsive parameter Fr is corresponding to a repulsive force between the first endpoint EP1 and the obstacle point OP. A repulsive direction of the repulsive force between the first endpoint EP1 and the obstacle point OP is from the obstacle point OP to the first endpoint. A magnitude fr of the repulsive parameter Fr can be calculated based on following formula:

$$fr = Vr/(1 + e^{(\|\overrightarrow{d_o}\| - d_{safe}) \times \alpha_r})$$

In the formula for calculating the magnitude fr of the repulsive parameter Fr, the term "$d_o$" is corresponding to a shortest distance vector $d_o$ between the current tool point cloud and the obstacle point cloud OPC, the term "$d_{safe}$" is corresponding to predetermined shortest safe distance, the term "Vr" is a maximum value of the magnitude fr of the repulsive parameter Fr, and the term "$\alpha_r$" is a shaping factor, which has an unit of the reciprocal of distance and is used to determine an influence of the repulsive force parameter Fr changing with the distance vector $d_o$.

Therefore, when the shortest distance vector $d_o$ is reduced such the corresponding distance between the tool 200 and the obstacle is also reduced, the magnitude fr of the repulsive force parameter Fr is gradually increased. When the shortest distance vector $d_o$ is increased such that the corresponding distance between the tool 200 and the obstacle is increased, the magnitude fr of the repulsive force parameter Fr is gradually decreased. When the shortest distance vector $d_o$ exits the safe distance $d_{safe}$, the magnitude fr of the repulsive force parameter Fr is reduced to zero, and the corresponding obstacle will no longer affect the planned path.

Taking the embodiment of FIG. 6 as an example, the shortest distance vector do is the first endpoint vector d1, the initial point of the first endpoint vector d1 is the first endpoint EP1, and the terminal point of the first endpoint vector d1 is the obstacle point OP.

However, it should be noted that as the poses of the obstacle and the tool 200 changes, the shortest distance vector do between the obstacle and the tool 200 changes. That is, during the movement of the tool 200, the obstacle point OP of the obstacle point cloud OPC is changed, and the point of the current tool point cloud TPC closest to the obstacle point cloud OPC is also changed and beyond the first endpoint EP1. Through the nearest neighbor algorithm, the obstacle point OP of the obstacle point cloud OPC and the nearest neighbor point in the current tool point cloud TPC can be obtained efficiently. In some embodiments, the Kalman filter can more effectively track and predict the selected obstacle point OP and the nearest neighbor point of the current tool point cloud TPC, wherein the nearest neighbor point is a point closest to the selected obstacle point OP in the current tool point cloud TPC.

Therefore, the repulsive force generating unit 156 can generate the repulsive force parameter Fr and output the repulsive force parameter Fr to the force integration unit 158. After the force integration unit 158 integrates the attractive force parameter Fa and the repulsive force parameter Fr, the force integration unit 158 can perform a calculation in real time to output the planned velocity Vt to the action integration unit 164, so that the robot body 182 can drive the tool 200 moves at the planned velocity Vt.

Please return to FIG. 4 and refer to FIG. 6 at the same time. Proceed to operation 360. In this embodiment, the virtual torque generating unit 160 establishes the virtual torque τ according to the tool parameters and the obstacle parameters. As mentioned above, in this embodiment, the tool parameter is the current tool point cloud TPC, and the obstacle parameter is the obstacle point cloud OPC. In FIG. 1, the repulsive force generating unit 156 receives the current tool point cloud TPC and the obstacle point cloud OPC. The virtual torque τ established by the virtual torque generating unit 160 can be used to rotate the tool 200.

Reference is made by FIG. 6. In this embodiment, the end effector 183 of the robot body 182 clamps the tool 200. The end effector 183 has an endpoint EP. The closest point to the tool 200 in the obstacle point cloud OPC is the obstacle point OP. The current tool point cloud TPC has a first endpoint EP1 and a second endpoint EP2. The first endpoint EP1 and the second endpoint EP2 are respectively located on two opposite boundaries of the current tool point cloud TPC. A distance vector De is between the endpoint EP and the obstacle point OP. The initial point of the distance vector De is the endpoint EP, and the terminal point of the distance vector De is the obstacle point OP. A first endpoint vector d1 is between the first endpoint EP1 and the obstacle point OP, the initial point of the first endpoint vector d1 is the first endpoint EP1, and the terminal point first endpoint vector d1 is the obstacle point OP. A second endpoint vector d2 is between the second endpoint EP2 and the obstacle point OP, the initial point of the second endpoint vector d2 is the second endpoint EP2, and the terminal point of the second endpoint vector d2 is the obstacle point OP. When the tool 200 moves, the endpoint EP has a endpoint velocity Ve. An angle θ is between the endpoint velocity Ve and the distance vector De. The endpoint velocity Ve is a velocity vector of the movement of the end effector 183 of the robot body 182 and corresponding to the movement speed of the tool 200 located on the end effector 183.

According to the embodiment of FIG. 6, in this embodiment, the virtual torque generating unit can obtain the virtual torque τ based on following formula:

$$\vec{\tau} = \|\vec{D_e}\| \sin\theta \times F_{max} \times \left(1 - \frac{\|\vec{d1}\|}{\|\vec{d2}\|}\right) \hat{R},$$

wherein the rotation axis vector $$\hat{R} = \frac{\vec{D_e}}{\|\vec{D_e}\|} \times \frac{\vec{V_e}}{\|\vec{V_e}\|}$$

In the above formula for calculating the virtual torque τ, the term "$F_{max}$" is corresponding to an upper limit of a predetermined imaginary rotational force. In the embodiment of FIG. 6, a corresponding rotation axis direction of the rotation axis vector R of the virtual torque τ is threading out the paper surface, and the direction corresponding to the virtual torque τ enables the tool 200 to rotate counterclockwise with a rotation axis passing through the endpoint EP. If the length of the first endpoint vector d1 is less than the length of the second endpoint vector d2, the virtual torque τ can cause the tool 200 to rotate counterclockwise, thereby reducing the length of the second endpoint vector d2. Otherwise, if the length of the first endpoint vector d1 is greater than the length of the second endpoint vector d2, the virtual torque τ can cause the tool 200 to rotate clockwise, thereby reducing the length of the first endpoint vector d1.

In this embodiment, through the virtual torque generating unit 160, the calculation of the virtual torque τ can be realized. The virtual torque τ calculated by the virtual torque generating unit 160 is output to the action integration unit 164 and converted into a planned angular velocity Wt for rotating the tool 200.

Return to FIG. 4. In operation 370, by the environment limitation unit 162 and based on the critical control point 185 (as shown in FIG. 3) of the robot body 182, the obstacle and environment, limitation parameter are established.

In operation 370, the environment limitation unit 162 can be used to further limit action of the robot body 182, and it ensures that the robot body 182 will not contact obstacles when the tool 200 moved by the robot body 182 moves along the planned obstacle avoidance path.

Specifically, since the robot body 182 is controllable, the coordinates of each critical control point 185 of the robot body 182 in space are known.

For each critical control point 185 of the robot body 182, the environmental limitation unit 162 can determine a safety distance. Once there is an obstacle that is less than the determined safety distance from the critical control point 185 or there is an unexpected change in the environment as an obstacle to invade the safety distance, the environment restriction unit 162 can provide a constraint velocity to the robot body 182 according to the distance between the key control point 185 and the obstacle point cloud OPC to force the critical control point 185, which is affected by the obstacle, of the robot body 182 to move at the constraint velocity. For the critical control point 185 that is not affected by the obstacle, a compensation speed is provided based on the restraint speed.

Therefore, the environmental limitation unit 162 integrates the above restrictions on the critical control points 185 of the robot body 182 and outputs the constraint velocity Vi to the action integration unit 164. The constraint velocity Vi is used as a limitation parameter of the robot body 182 to force the velocity of each critical control point 185 under certain conditions.

Then, proceed to operation 380, according to the attractive force parameter Fa, the repulsive force parameter Fr, the virtual torque τ and the limitation parameters, the robot body 182 of the robot 180 is controlled to be moved or rotated by the action integration unit 164.

For the movement and rotation of the tool 200, the action integration unit 164 receives the planned velocity Vt from the force integration unit 158 and the planned angular velocity Wt from the virtual torque generating unit 160. The action integration unit 164 can convert the planned velocity Vt and the planned angular velocity Wt into an action of the robot body 182 through the Jacobian matrix, thereby establishing corresponding the control signal CS used to control the robot body 182 and causing the end effector 183 of the robot body 182 enables the tool 200 to move at the planned velocity Vt and rotate at the planned angular velocity Wt.

The obstacle avoidance of the robot body 182 can be restricted by limiting the constraint velocity Vi.

In this way, the action integration unit 164 unifies the planned velocity Vt, the planned angular velocity Wt and the constraint velocity Vi and converts them into the control signal CS for the robot body 182. After the control signal CS is received by the robot controlling device 190 of the robot 180, the robot controlling device 190 drives the robot body 182 to control the robot body 182 to move or rotate the tool 200.

The robot controlling method 300 is executed until the tool 200 achieves the target coordinates Pt. During the movement and rotation of the tool 200, the depth camera 110 keeps capturing the raw depth images RDI near the workspace of the robot 180 and the motion processing device 120 keeps processing the image, separating the point clouds and providing the control signal CS in real time.

The establishment of the virtual torque τ can enable the tool 200 to move in a shorter avoidance path.

Figure 7:
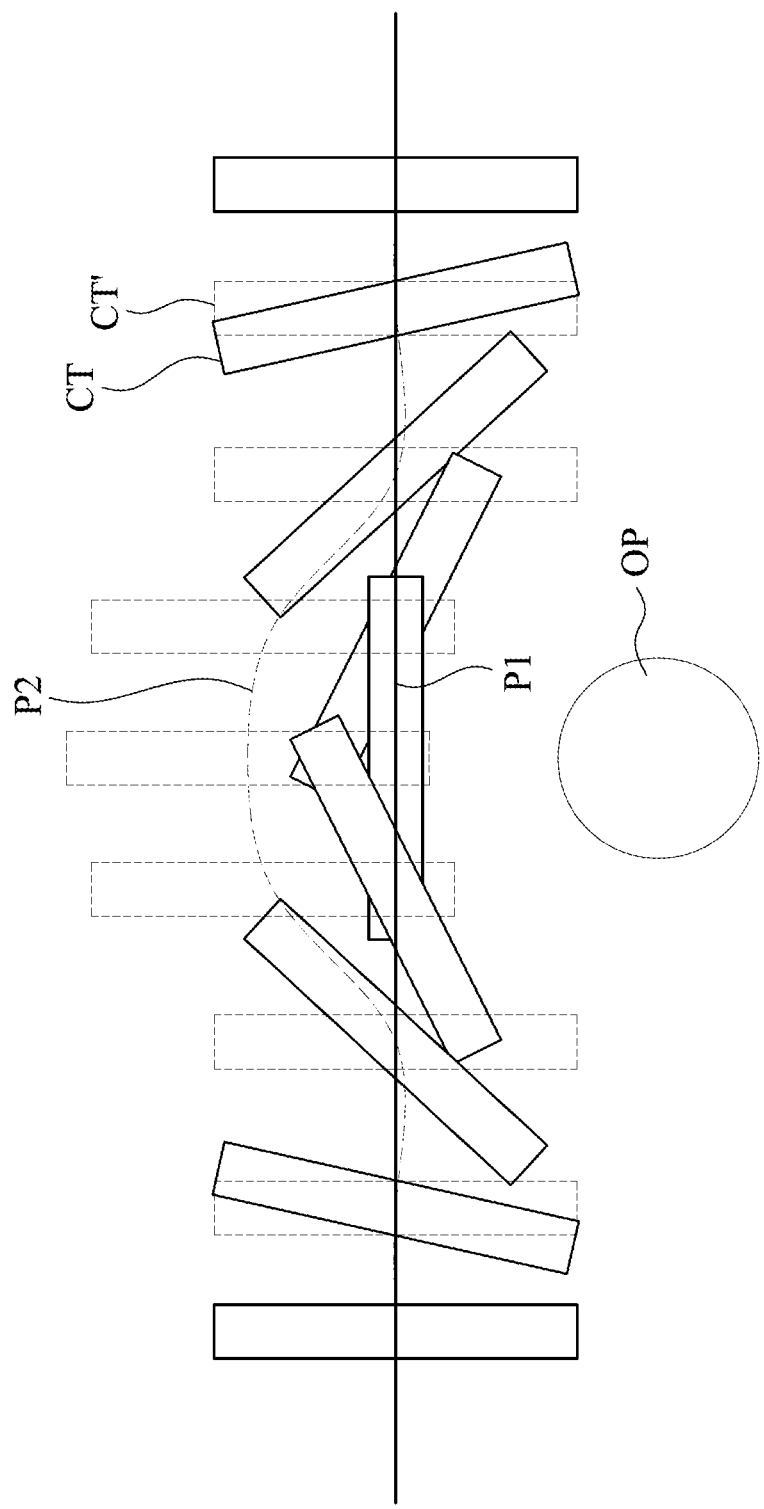
FIG. 7 shows a schematic diagram of the improvement of obstacle avoidance path.

FIG. 7 shows a schematic diagram of the improvement of obstacle avoidance path. The movement paths of the tool CT with virtual torque and the tool CT' without virtual torque are represented by path P1 and path P2, respectively. The path P1 and the path P2 respectively correspond to the movement trajectory of the endpoint EP of the end effector 183 of the robot body 182, wherein the tool 200 is clamped by the end effector 183.

Dash line of the movement path P2 of the tool CT', the movement path P2 corresponds to the path planning result that only considers the attractive force parameter Fa in operation 340 and repulsive force parameter Fr in operation 350. On the movement path P2, the tool CT' remains relative to the obstacle point OP on the same side. Therefore, the tool 200 maintains the same posture when the tool 200 bypasses the obstacle point OP along the movement path P2.

The path P1 corresponding to the tool CT of this embodiment is represented by a solid line. Considering operation 340 to operation 360, the tool CT moves along the path P1. Under the premise of considering the attractive force parameter Fa and the repulsive force parameter Fr, a virtual torque τ is further provided such that the tool 200 rotates, causing the current tool CT to rotate and be positioned relative to the obstacle point OP with varying angles during the movement along the path P1. This allows the path P1 to tend to a straight line. Therefore, the length of the path P1 is less than that of the path P2. That is, after considering the virtual torque τ, the tool 200 can move to the target in a short path to perform a task.

Figure 8:
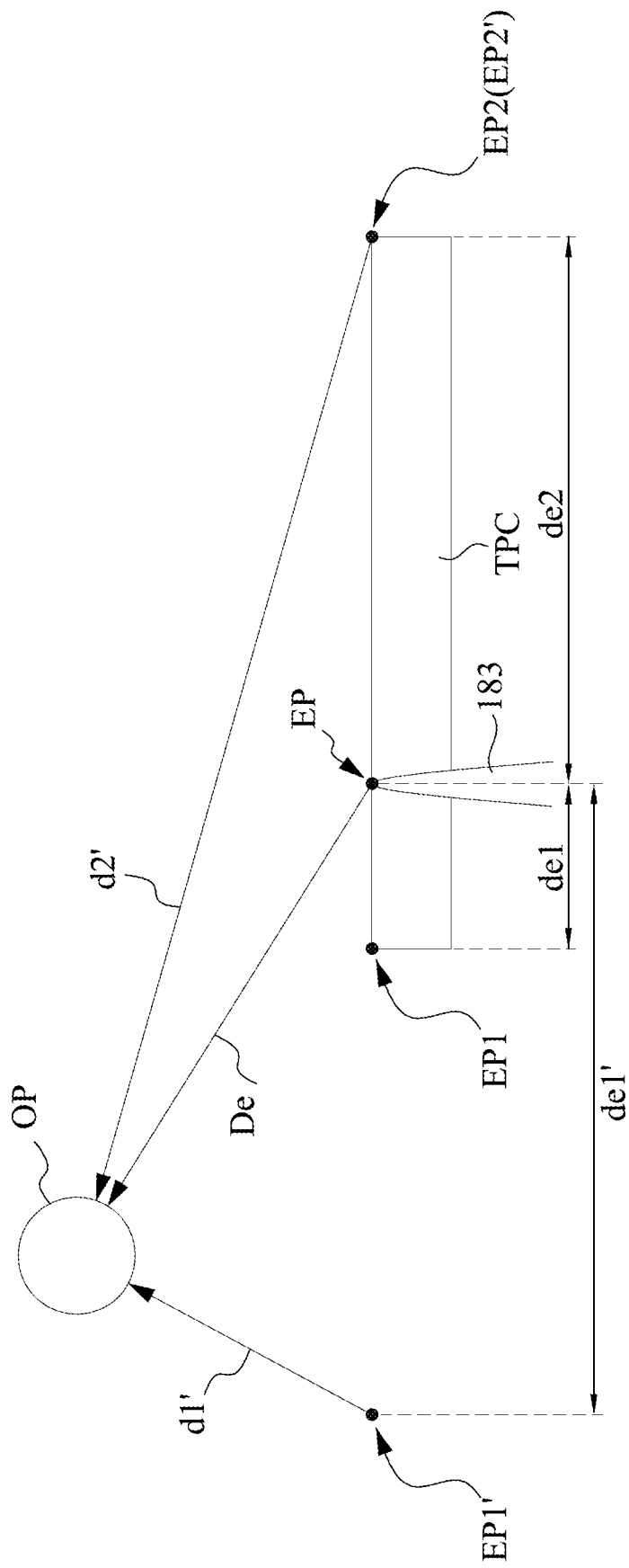
FIG. 8 illustrates a schematic view of a plurality of vectors required in a robot controlling method according to one embodiment of the present disclosure.

FIG. 8 illustrates a schematic view of a plurality of vectors required in a robot controlling method according to one embodiment of the present disclosure.

In some embodiments, due to the uneven weight distribution of the tool 200, the center of mass of the tool 200 deviates from the center of the tool 200, so that the end effector 183 does not clamp the center of the tool 200. In such case, a distance de1 between the first endpoint EP1 and the endpoint EP is different from a distance de2 between the second endpoint EP2 and the endpoint EP. In the embodiment shown in FIG. 8, the distance de1 is less than the distance de2.

In such case, when the virtual torque τ is established based on operation 360 of the robot controlling method 300, the first virtual endpoint EP1' can be established based on the distance de2, and the second virtual endpoint EP2' can be set as the original second endpoint EP2. The distance de1' between the first virtual endpoint EP1' and the endpoint EP is equal to the distance de2 between the second virtual endpoint EP2' and the endpoint EP. In other words, the endpoint EP is equidistant from the virtual endpoint EP1' and the virtual endpoint EP2'.

Equivalently, it can be considered that a virtual tool has been established. The virtual tool has the first virtual endpoint EP1' and the second virtual endpoint EP2', and the tool 200 in FIG. 8 can be regarded as a part of the virtual tool.

In this way, it is only necessary to ensure that the created virtual tool can dodge obstacles, and the tool 200 that is part of the virtual tool can also dodge obstacles. That is, the virtual torque generating unit 160 directly generates the virtual torque τ for the virtual tool and applies the virtual torque τ directly to the rotation of the tool 200.

Accordingly, the virtual torque τ can be established referred to the embodiment of mentioned FIG. 6, the virtual torque τ can be calculated using the virtual torque generating unit 160 by following formula:

$$\vec{\tau} = \|\overrightarrow{D_e}\| \sin\theta \times F_{max} \times \left(1 - \frac{\|\overrightarrow{d1'}\|}{\|\overrightarrow{d2'}\|}\right) \hat{R}$$

In the above formula for calculating the virtual torque τ, the term "d1'" is a first endpoint vector d1' between the first virtual endpoint EP1' and the obstacle point OP, the initial point of the first endpoint vector d1' is the first virtual endpoint EP1', and the terminal point of the first endpoint vector d1' is the obstacle point OP. The term "d2'" is a second endpoint vector d2' between the second virtual endpoint EP2' and the obstacle point OP, the initial point of the second endpoint vector d2' is the second virtual endpoint EP2', and the terminal point of the second endpoint vector d2' is the obstacle point OP.

Therefore, for any of the tools 200 with different shapes, virtual endpoints can be established by referring to the embodiment shown in FIG. 8 to calculate the virtual torque τ. The calculated virtual torque τ can be applied to the rotation of the tool 200.

In summary, the present disclosure provides a robot controlling method and corresponding robot system and motion computing device. For a robot with a tool, the present disclosure can plan an obstacle avoidance path for the tool, and through the establishment of a virtual torque, the tool can rotate to avoid obstacles when moving to the target, thereby shortening the movement path. A short path can make the tool more efficient in dodging obstacles.

Although the present invention has been described in considerable detail with reference to certain embodiments thereof, other embodiments are possible. Therefore, the spirit and scope of the appended claims should not be limited to the description of the embodiments contained herein. In view of the foregoing, it is intended that the present invention cover modifications and variations of this invention provided they fall within the scope of the following claims.

What is claimed is:

1. A robot controlling method comprising:
   capturing, by a depth camera, a depth image of a robot and a workspace of the robot, wherein a tool is disposed on an end of the robot;
   receiving the depth image and obtaining an obstacle parameter of an obstacle and a tool parameter of the tool according to the depth image by a processing circuit, wherein the tool parameter comprises two opposite endpoints of the tool and the obstacle parameter comprises an obstacle point;
   obtaining, by the processing circuit, a distance vector between the end of the robot and the obstacle parameter;
   establishing, by the processing circuit, a first endpoint vector and a second endpoint vector between the tool parameter and the obstacle parameter according to the tool parameter and the obstacle parameter, wherein the first endpoint vector and the second endpoint vector are established according to the two opposite endpoints of the tool and the obstacle point of the obstacle respectively by the processing circuit;

establishing, by the processing circuit, a virtual torque according to the distance vector, the first endpoint vector, and the second endpoint vector; and outputting, by the processing circuit, a control signal according to the tool parameter, the obstacle parameter and the virtual torque to the robot to drive the robot to move and rotate the tool to a target, wherein the control signal is adjusted based on the virtual torque to rotate the robot and reduce a length of the first endpoint vector when a length of the first endpoint vector is greater than the length of the second endpoint vector.

2. The robot controlling method of claim 1, further comprising:

establishing, by the processing circuit, an object point cloud according to the depth image;

establishing, by the processing circuit, an obstacle point cloud according to the object point cloud;

establishing, by the processing circuit, a current tool point cloud of the tool according to the object point cloud; and obtaining, by the processing circuit, the tool parameter and the obstacle parameter according to the current tool point cloud and the obstacle point cloud respectively.

3. The robot controlling method of claim 2, wherein establishing the tool parameter and the obstacle parameter according to the current tool point cloud and the obstacle point cloud respectively by the processing circuit further comprises:

establishing, by the processing circuit, a history tool point cloud information according to the object point cloud;

segmenting, by the processing circuit, an observation tool point cloud from the object point cloud according to the history tool point cloud information;

establishing, by the processing circuit, a prediction tool point cloud according to the history tool point cloud information and a robot pose of the robot; and superimposing, by the processing circuit, the observation tool point cloud and the prediction tool point cloud to establish the current tool point cloud.

4. The robot controlling method of claim 2, further comprising:

separating, by the processing circuit, a background point cloud from the object point cloud according to a recorded background information; and separating, by the processing circuit, a robot point cloud from the object point cloud according to a robot pose information, wherein before establishing the current tool point cloud of the tool and the obstacle point cloud of the obstacle according to the object point cloud, the processing circuit is used to subtract the background point cloud and the robot point cloud from the object point cloud.

5. The robot controlling method of claim 2, wherein the distance vector between the end of the robot and the obstacle point of the obstacle is established by the processing circuit.

6. The robot controlling method of claim 5, wherein two initial points of the first endpoint vector and the second endpoint vector respectively correspond to the two opposite endpoints of the tool, a terminal point of the first endpoint vector is the same as a terminal point of the second endpoint vector, the same terminal point of the first and the second endpoint vectors is the obstacle point of the obstacle parameter, and establishing the virtual torque by the processing circuit comprises:

establishing a magnitude of the virtual torque according to the first endpoint vector and the second endpoint vector; and establishing, by the processing circuit, a direction of the virtual torque according to the distance vector and an endpoint velocity of the end of the robot.

7. The robot controlling method of claim 1, further comprising:

obtaining, by the processing circuit, an attractive force parameter according to a first vector between the robot and a target; and obtaining, by the processing circuit, a repulsive force parameter according to a second vector between the robot and the obstacle parameter, wherein the processing circuit is used to output the control signal according to the attractive force parameter, the repulsive force parameter and the virtual torque to drive the robot to move and rotate the tool to the target when the processing circuit is used to output the control signal to the robot according to the tool parameter.

8. The robot controlling method of claim 7, further comprising:

adding and converting, by the processing circuit, the attractive force parameter and the repulsive force parameter into a speed command, wherein the speed command is used to control the robot to drive the tool to move;

converting, by the processing circuit, the virtual torque into an angular velocity command, wherein the angular velocity command is used to control the robot to drive the tool to rotate;

converting, by the processing circuit, a limitation parameter into a limitation command, wherein the limitation parameter is associated with a third vector between a critical control point of the robot and the obstacle parameter, and the limitation parameter is configured to limit a speed of the critical control point of the robot; and obtaining the control signal according to the speed command, the angular velocity command and the limitation command.

9. The robot controlling method of claim 1, wherein when a distance between one endpoint of the tool and the end of the robot is different from a distance between an opposite one endpoint of the tool and the end of the robot, the processing circuit is used to establish the end of the robot equidistant from two virtual endpoints according to the two endpoints of the tool, the two virtual endpoints are used for the tool parameter, the distance vector between the end of the robot and the obstacle point is established by the processing circuit, and the first endpoint vector and the second endpoint vector are established according to the two virtual endpoints and the obstacle point of the obstacle parameter by the processing circuit.

10. A motion computing device, comprising:

a processing circuit;

a memory electrical connected to the processing circuit; and one or more programs stored in the memory to be launched by the processing circuit and comprising instructions for:

receiving a depth image of a robot and a workspace of the robot captured by a depth camera, wherein a tool is disposed on an end of the robot;

obtaining an obstacle parameter of an obstacle and tool parameter of the tool according to the depth image, wherein the tool parameter comprises two opposite endpoints of the tool and the obstacle parameter comprises an obstacle point;

obtaining a distance vector between the end of the robot and the obstacle parameter;

establishing a first endpoint vector and a second endpoint vector according to the tool parameter and the obstacle parameter, wherein the first endpoint vector and the second endpoint vector are established according to the two opposite endpoints of the tool and the obstacle point of the obstacle respectively by the processing circuit;

establishing a virtual torque according to the distance vector, the first endpoint vector, and the second endpoint vector; and outputting a control signal according to the tool parameter, the obstacle parameter and the virtual torque to the robot to drive the robot to move and rotate the tool to a target, wherein the control signal is adjusted based on the virtual torque to rotate the robot and reduce a length of the first endpoint vector when a length of the first endpoint vector is greater than the length of the second endpoint vector.

11. A robot system, comprising:

a robot comprising an end, wherein a tool disposed on the end;

a depth camera configured to capture the robot and a workspace of the robot to obtain a depth image;

a motion computing device configured to receive the depth image and output a control signal according to the depth image to drive the robot, wherein the motion computing device comprising:

a processing circuit;

a memory electrical connected to the processing circuit; and one or more programs stored in the memory to be launched by the processing circuit and comprising instructions for:

receiving a depth image of the robot and the workspace of the robot captured by a depth camera, wherein a tool is disposed on the end of the robot;

obtaining an obstacle parameter of an obstacle and tool parameter of the tool according to the depth image, wherein the tool parameter comprises two opposite endpoints of the tool and the obstacle parameter comprises an obstacle point;

obtaining a distance vector between the end of the robot and the obstacle parameter;

establishing a first endpoint vector and a second endpoint vector according to the tool parameter and the obstacle parameter;

establishing a virtual torque according to the distance vector, the first endpoint vector, and the second endpoint vector, wherein the first endpoint vector and the second endpoint vector are established according to the two opposite endpoints of the tool and the obstacle point of the obstacle respectively by the processing circuit; and outputting a control signal according to the tool parameter, the obstacle parameter and the virtual torque to the robot to drive the robot to move and rotate the tool to a target, wherein the control signal is adjusted based on the virtual torque to rotate the robot and reduce a length of the first endpoint vector when a length of the first endpoint vector is greater than the length of the second endpoint vector.

12. The robot system of claim 11, wherein the one or more programs further comprises instructions for:

establishing an object point cloud according to the depth image;

establishing an obstacle point cloud according to the object point cloud;

establishing a current tool point cloud of the tool according to the object point cloud; and obtaining the tool parameter and the obstacle parameter according to the current tool point cloud and the obstacle point cloud respectively.

13. The robot system of claim 12, wherein the establishing the current tool point cloud of the tool according to the object point cloud further comprises:

establishing a history tool point cloud information according to the object point cloud;

segmenting an observation tool point cloud from the object point cloud according to the history tool point cloud information;

establishing a prediction tool point cloud according to the history tool point cloud information and a robot pose of the robot; and superimposing the observation tool point cloud and the prediction tool point cloud to establish the current tool point cloud.

14. The robot system of claim 12, wherein the one or more programs further comprises:

separating a background point cloud from the object point cloud according to a recorded background information; and separating a robot point cloud from the object point cloud according to a robot pose information, wherein before establishing the current tool point cloud of the tool and the obstacle point cloud of the obstacle according to the object point cloud, the processing circuit is used to subtract the background point cloud and the robot point cloud from the object point cloud.

15. The robot system of claim 12, wherein the obstacle parameter comprises an obstacle point, the distance vector between the end of the robot and the obstacle point of the obstacle is established by the processing circuit.

16. The robot system of claim 15, wherein two initial points of the first endpoint vector and the second endpoint vector respectively correspond to the two opposite endpoints of the tool, a terminal point of the first endpoint vector is the same as a terminal point of the second endpoint vector, the same terminal point of the first and second endpoint vectors is the obstacle point of the obstacle parameter, and establishing the virtual torque further comprises:

establishing a magnitude of the virtual torque according to the first endpoint vector and the second endpoint vector; and establishing a direction of the virtual torque according to the distance vector and an endpoint velocity of the end of the robot.

17. The robot system of claim 11, wherein the one or more programs further comprises instructions for:

obtaining an attractive force parameter according to a first vector between the robot and a target; and obtaining a repulsive force parameter according to a second vector between the robot and the obstacle parameter, wherein the processing circuit is used to output the control signal according to the attractive force parameter, the repulsive force parameter and the virtual torque to drive the robot to move and rotate the tool to the target when the processing circuit is used to output the control signal to the robot according to the tool parameter.

18. The robot system of claim 17, wherein the one or more programs further comprises instructions for:
- adding and converting the attractive force parameter and the repulsive force parameter into a speed command, wherein the speed command is used to control the robot to drive the tool to move;
- converting the virtual torque into an angular velocity command, wherein the angular velocity command is used to control the robot to drive the tool to rotate;
- converting a limitation parameter into a limitation command, wherein the limitation parameter is associated with a third vector between a critical control point of the robot and the obstacle parameter, and the limitation parameter is configured to limit a speed of the critical control point of the robot; and
- obtaining the control signal according to the speed command, the angular velocity command and the limitation command.

* * * * *